United States Patent [19]

Nakano et al.

[11] 3,852,426

[45] Dec. 3, 1974

[54] PROCESS FOR PRODUCING COPYAMYCIN DERIVATIVES

[75] Inventors: Kinichi Nakano; Norio Nishiyama, both of Tokyo, Japan

[73] Assignee: Kyowa Hakko Kogyo Kabushiki Kaisha, Tokyo-to, Japan

[22] Filed: Mar. 31, 1970

[21] Appl. No.: 24,380

Related U.S. Application Data

[63] Continuation-in-part of Ser. No. 827,402, May 23, 1969, abandoned, which is a continuation-in-part of Ser. No. 674,981, Oct. 12, 1967, abandoned.

[30] Foreign Application Priority Data
Oct. 13, 1966 Japan.............................. 41-66900

[52] U.S. Cl................................. 424/120, 424/115

[51] Int. Cl............................................ A61k 21/00
[58] Field of Search........................... 424/115, 120

[56] References Cited
UNITED STATES PATENTS
3,087,859   4/1963   Smythe et al...................... 424/122

OTHER PUBLICATIONS
Derwent Farmdoc No. 20556, Abstracting, Neta. 6,511,353, published 3-1-66, pages 475 and 482.

*Primary Examiner*—Jerome D. Goldberg
*Attorney, Agent, or Firm*—Wolder & Gross

[57] ABSTRACT

The present invention relates to a process for preparing the lower aliphatic esters of copiamycin, dihydro-copiamycin and tetrahydro-copiamycin.

6 Claims, 5 Drawing Figures

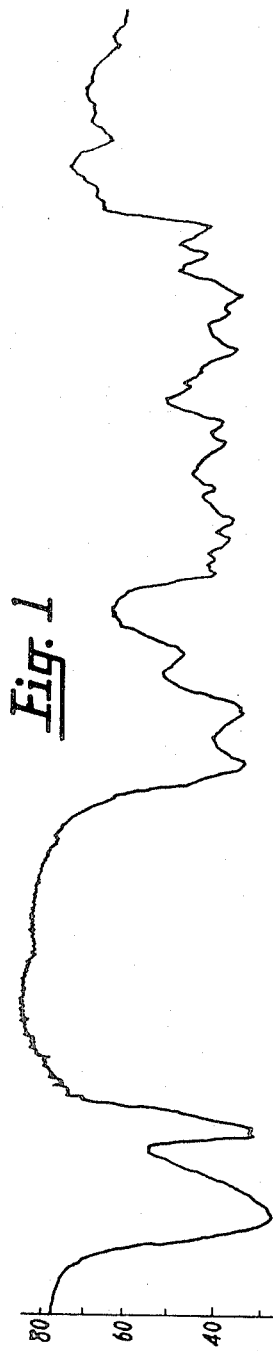
Fig. 1
Fig. 2

PROCESS FOR PRODUCING COPYAMYCIN DERIVATIVES

The present application is a continuation-in-part of Ser. No. 827,402, filed May 23, 1969, which in turn is a continuation-in-part of Ser. No. 647,981, filed Oct. 12, 1967, both now abandoned, all for the present inventors.

BACKGROUND OF INVENTION

Copiamycin is a new antibiotic of the non-polyen antifungal type produced by Streptomyces hygroscopicus No. 1898 or its mutant, which have ATCC numbers 19040. Copiamycin-producing strain ATCC 19040 is freely available to the public from said depository. Both dihydro-copiamycin and tetrahydro-copiamycin are also new derivatives of copiamycin prepared by the catalytic reduction thereof.

The preparation of copiamycin is described in Japanese Patent Publication 18519/1966, as well as J. Antibiotics, Series A., 1863 (1965), which are herewith incorporated by reference. The preparation of dihydro-copiamycin and tetrahydro-copiamycin is described in Japanese Pat. application No. 67872/1966, and its corresponding U.S. application Ser. No. 674,982 filed Oct. 12, 1967 in the names of the present inventors and Tadashi Arai, which are also incorporated by reference. Basically, such derivatives are prepared by the catalytic reduction of copiamycin. If methyl alcohol or glacial acetic acid is used as solvent, dihydro-copiamycin or tetrahydro-copiamycin can be prepared respectively. More particularly, as described in Ser. No. 674,982, it was found that hydro-copiamycin may be formed by catalytically reducing copiamycin which has been dissolved in a lower alchohol, e.g., methanol, ethanol or buthanol, in the presence of a reducing catalyst, e.g., platinum, palladium carbon or Raney-nickel under normal or elevated pressure in hydrogen atmosphere. in this reaction, one mol of hydrogen is adsorbed by copiamycin. It was also found that tetrahydro-copiamycin can be obtained by carrying out the reduction of copiamycin in acetic acid in which two mols of hydrogen are adsorbed by copiamycin. Tetrahydro-copiamycin can also be obtained by carrying out a similar catalytic reduction of dihydro-copiamycin in acetic acid solution so that one mol of hydrogen is adsorbed by the dihydro-copiamycin to give tetrahydrocopiamycin.

By way of a specific illustration, dihydrocopiamycin can be obtained by the following process:

Copiamycin is dissolved in a lower alcohol e.g. $AC_1$ to $C_8$ alcohol, such as methanol, ethanol or butanol. The concentration can desirably be determined within a range in which copiamycin can sufficiently be dissolved therein, although a concentration of about 1 percent is preferable.

The reducing catalysts which may be used for the process of the present invention include those of the known types, e.g., palladium, carbon or Raney nickel, although platinum oxide is most advantageous for this purpose. It is sufficient to use a catalyst in an amount of about 1–10 percent by weight of copiamycin. The reducing reaction can be carried out in hydrogen atmosphere under normal or elevated pressure, e.g., 1 to 150 $kg/cm^2$ at room or elevated temperature, e.g., 0° to 100°C in a conventional manner. When the reaction is carried out at room temperature under atmospheric pressure, the adsorption of hydrogen may be continued for about 30 minutes. It has been observed that when the molecular weight of copiamycin is assumed to be 1,100, the amount of the adsorbed hydrogen is one mol.

After completion is the reaction, the catalyst is removed. The reaction mixture is then concentrated under reduced pressure to dryness. Ether is then added to give a white precipitate of dihydro-copiamycin.

Tetrahydro-copiamycin can be prepared as follows:

Copiamycin is first dissolved in acetic acid. Water content of the acetic acid solution is not critical, since the reaction occurs between the copiamycin and the acetic acid. The concentration can be determined within a range in which copiamycin is sufficiently dissolved, but a concentration of about 10 percent is most advantageous for this purpose. Type and amount off the catalyst to be used and the reaction conditions are similar to those suitable for the preparation of dihydro-copiamycin. When the reaction is carried out at room temperature under atmospheric pressure, the adsorption of hydrogen is discontinued after about 30 minutes. In this reaction, the adsorbed amount of hydrogen is 2 mols when the molecular weight of copiamycin is assumed to be about 1,100. After the reaction is completed, the catalyst is removed off. The reaction mixture is concentrated to dryness under reduced pressure and is then added with ether to given white precipitates of tetrahydro-copiamycin.

Further details will be found in original Ser. No. 674.982 which has been abandoned in favor of later continuation-in-part applications, such as filed on Mar. 8, 1972 as a continuation-in-part of Ser. No. 23,134 now abandoned.

Copiamycin and the foregoing derivatives have been found to have antifungi activity. However, since copiamycin and its reduction products are insoluble, or only slightly soluble in water, their use in therapeutic applications is considerbly limited.

SUMMARY

In accordance with the present invention, new and useful derivatives of copiamycin are produced which are highly soluble in water, and accordingly, readily applied for therapeutic and other uses. Moreover, the acylated products of the present invention normally have stronger antifungi activity than exhibited by copiamycin, as well as offer greater activity than the copiamycin derivatives from which they are produced. Thus, the compounds of the present invention may sidely be used for therapeutic, and other purposes such as trichomonas, trichophyton and various other plant diseases.

Whereas water solubility of the copiamycin and reduction products thereof is less than 1 γ/ml, the water solubility of the copiamycin esters of the present invention is greater than 500 γ/ml. Normally such esters are also of stronger antifungal activity.

Basically, highly water soluble derivatives of copiamycin and its reduction products are obtained by acylating copiamycin and its reduction products such as dihydro-copiamycin and tetrahydro-copiamycin, with an anhydride of a lower carboxylic acid in a suitable organic solvent capable of dissolving copiamycin and its reduction product, as for example, a lower alcohol.

Copiamycin or its reduction product, e.g., dihydro-copiamycin, tetrahydro-copiamycin, etc., is first dissolved or suspended in a suitable solvent capable of dissolving the reacting copiamycin or its derivatives such as alcohols, preferably $C_1$ to $C_6$ alcohols (e.g., methanol, ethanol, propanol, butanol, hexanol, cyclohexanol, ethylene glycol, propylene glycol, glycerol, etc.) alcohol ethers, preferably C to C alcohol ethers, (e.g., Celosolves, Carbidols, polyethylene glycols, etc.), acid amides, preferably e.g., formamide, N, N-dimethyl formamide, etc.). Alternatively, copiamycin or its reduction product is dissolved in a suitable solvent capable of dissolving copiamycin or its reduction product such as, e.g., methanol-chloroform, ethanol, chloroform, etc.

Generally, 1 to 100 ml of solvent are employed per gram of copiamycin compound, but amounts sufficient to cause suspending or dissolving of the copiamycin compound can be employed.

Thereafter, an acid anhydride is added thereto dropwise with stirring. Saturated and unsaturated anhydrides of carboxylic acids having 1 – 5 carbons, such as, e.g., acetic anhydride, propionic anhydride, butyric anhydride, valeric anhydride, crotonic anhydride, etc. may be used as the acid anhydride according to the present invention. $C_2$ to $C_4$ carboxylic anhydrides are preferred.

Generally, about 1 to 100, preferably 10 to 50 mols of acid anhydride are added per mol of copiamycin or its derivative, with sufficient solvent to dissolve the reacting copiamycin or its derivatives being employed.

The reaction be carried out ice-cooling and reflux temperatures, e.g., 0°C to 100°C. However, the reaction time can be shortened at an elevated temperature, e.g., 30° to 70°C, and such temperatures are therefore preferred. After the completion of the reaction, which can, for example, be determined by the thin-layer chromatography, the reaction mixture is dried under reduced pressure. Either may then be added to give the precipitate of the acylated product. The carboxylate derivative can be recovered by other means.

The acylated copiamycin derivatives of the present invention are useful in combating the growth of the various fungi indicated in Table 1, such as glomerella cingulata, torula utilis, etc.

They may be administered to inhibit growth of such fungi in plants and in animals.

When employed in plants, the present compositions are administered in a concentration of about 80 ppm. by treating the plant in conventional manner. They are particularly effective on rice, wheat and other Graminacae plants.

They can also be used in treating non-human animals such as e.g., rats and mice. In such case, they are administered intraperitioneally (e.g., 0.5 – 4 mg/Kg. mouce).

When employed for human therapeutic treatment, they are suitable e.g., for treatment for candidasis. In such case, the acylated copiamycin products are administered in the form of varginal tablet (10 mg/day).

DRAWINGS

FIG. 1 shows an infra-red absorption curve of acetyl copiamycin obtained by the KBr tablet method;

FIG. 2 shows an infra-red absorption curve of acetyl-dihydro-copiamycin obtained by the KBr tablet method;

DETAILED DESCRIPTION

The following description, drawings referred to therein and accompanying examples will further illustrate the various aspects of the present invention.

EXAMPLE 1

550 mg of copiamycin was dissolved in 14 ml of methanol. 1.37 ml of acetic anhydride was added dropwise to the dissolved copiamycin at room temperature with stirring.

The reaction was then continued for 96 hours at a temperature of 25°C. The completion of the reaction is determined by the thin layer chromatography. The reaction solution was then concentrated and further dried under reduced pressure. Ether was then added to the dried product and the precipitates produced by adding ether were separated by filtration.

A product yield of 500 mg was obtained. The product had the infra-red spectrum shown in FIG. 1, as well as the following characteristics:

White powder, mp 100° – 103°C (decomp)
27 = +41.2   (C=2.8 MeOH)
D

Elemental analysis:
C = 58.54%
H = 8.83 %
N = 3.08%
Acetyl value:   4.12%
U.V. absorption:   end absorption Thin layer chromatography: An aqueous solution containing pyridine and n-buthanol (water: pyridine; n-buthanol = 7:4: 3) was used as solvent. The sample was developed on a plate using silica gel to give a single spot at Rf = 0.66 which is distinguishable from copiamycin (Rf = 0.25).

EXAMPLE 2

500 mg of copiamycin was dissolved in 14 ml. of methanol and to the solution 1.87 ml of acetic anhydride was added dropwise. The reaction was then completed by refluxing (temperature of about 65°C) for 2 hours.

Acetylcopiamycin was obtained by the similar treatment of the reaction product as described in Example 1 and the product had essentially the same infra-red spectrum shown in FIG. 1.

EXAMPLE 3

A reaction as described in Example 2 was carried out with the exception of the use of 500 mg of dihydrocopiamycin. All other quantities of materials and conditions were the same.

450 mg of acetyl-dihydro-copiamycin, were produced, having the infra-red spectrum shown in FIG. 2.

EXAMPLE 4

The same reaction conditions and quantities were employed as in Example 2 except 500 mg of tetrahydro-copiamycin was used as the reactant instead of copiamycin.

Figures 3, 4:
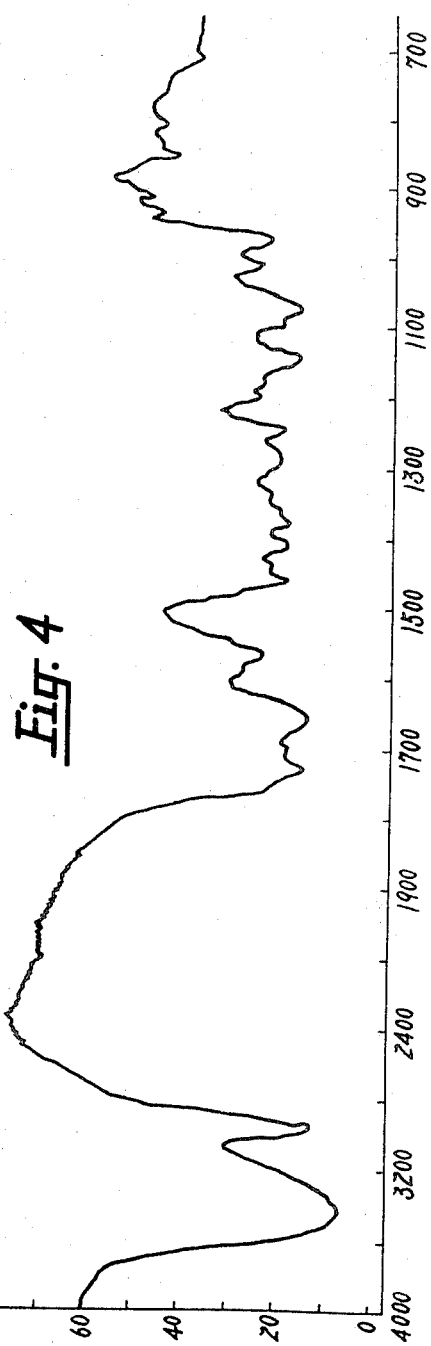
FIG. 3 shows an infra-red absorption curve of acetyl-tetrahydro-copiamycin obtained by the KBr tablet method.
FIG. 4 shows an infra-red absorption curve of propionyl-copiamycinn obtained by the KBr tablet method.

450 mg of acetyl-tetrahydro-copiamycin was thereby produced and recovered. The infra-red spectrum of the product is shown in FIG. 3.

EXAMPLE 5

500 mg of copiamycin was dissolved in 14 ml of methanol. 2.0 ml of propionic anhydride was then added dropwise with stirring. The reaction was completed by refluxing (temperature of 65°C) for 2 hours.

The reaction solution was concentrated and dried under reduced pressure. The precipitates produced by adding ether was separated by filtration to give 450 mg of propionyl copiamycin.

Infra-red spectrum of the product is shown in FIG. 4.

EXAMPLE 6

A similar reaction to that of Example 5 was carried out using 500 mg of copiamycin and 2.0 ml of butyric anhydride to give 450 mg of butrylcopiamycin. All other reaction conditions were the same as in Example 5.

Figure 5:
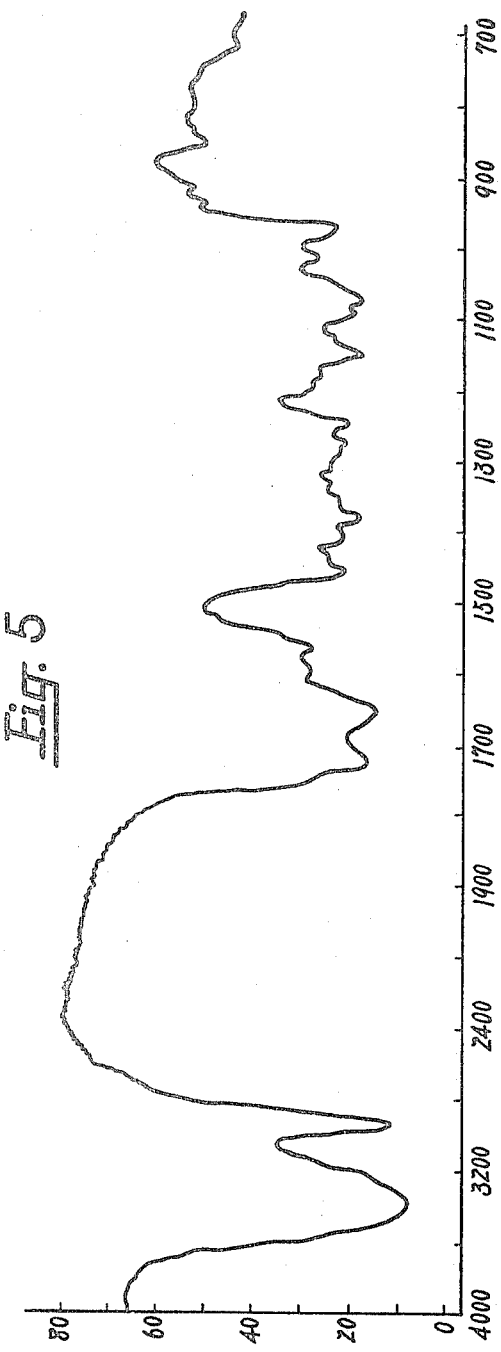
FIG. 5 shows an infra-red absorption curve of butyl-copiamycin obtained by the KBr tablet method.

Infra-red spectrum of the product thereby obtained (butryl-copiamycin) is shown in FIG. 5.

EXAMPLES 7-14

The minimum concentration levels ($\gamma$/ml) for inhibiting the growth of various fungi set forth as follows in Table 1 compare the acylated products of the present invention (obtained pursuant to Examples 1-6), with copiamycin, dihydro-copiamycin and tetrahydro-copiamycin.

In all cases, the tests were run by using Sabourand medium at pH 9.0, at 28°C, for 40 hours.

As shown in Table 1, the present compositions offer good anti-fungi activity, and are normally more active than copiamycin.

EXAMPLE 15

Copiamycin (500 mg) was dissolved in ethyl alcohol (14 ml) and subjected to the reaction which was carried out in a similar manner to that described in Example 2 to obtain an analogous product to that described in Example 1.

EXAMPLE 16

Copiamycin (500 mg) was dissolved in n-propyl alcohol (14 ml) and subjected to the reaction which was carried out in a similar manner to that described in Example 2 to obtain an analogous product to that described in Example 1.

EXAMPLE 17

Copiamycin (500 mg) was dissolved in n-butyl alcohol (14 ml) and subjected to the reaction which was carried out in a similar manner to that described in Example 2 to obtain an analogous product to that described in Example 1.

EXAMPLE 18

Copiamycin (500 mg) was dissolved in ethylene glycol monomethyl ether (30 ml) and subjected to the reaction which was carried out in a similar manner to that described in Example 2 to obtain an analogous product to that described in Example 1.

EXAMPLE 19

Copiamycin (500mg) was dissolved in N, N-dimethyl formamide (14 ml) and subjected to the reaction which was carried out in a similar manner to that described in Example 2 to obtain an analogous product to that described in Example 1.

EXAMPLE 20

The following example demonstrates the anti-trichomonas effect of aceylated copiamycin derivatives of the present invention as compared to copiamycin.

TABLE 1

| Example | Compound | Glomerella cingulata ($\gamma$/ml) | Cleosporium lacticolor ($\gamma$/ml) | Tolula Utilis ($\gamma$/ml) | Saccharomycas cerevisiae ($\gamma$/ml) | Rhizopas nigricars ($\gamma$/ml) | Aspergillus niger ($\gamma$/ml) |
|---|---|---|---|---|---|---|---|
| 7 | Copiamycin | 0.78 | 0.78 | 6.25 | 6.25 | 0.39 | 25 |
| 8 | Dihydro-copiamycin | 3.25 | 1.56 | >50 | >50 | >50 | >50 |
| 9 | Tetrahydro-copiamycin | 6.25 | 1.56 | >50 | >50 | >50 | >50 |
| 10 | Acetyl copiamycin | 1.56 | 1.56 | 6.25 | 3.125 | 3.125 | 12.5 |
| 11 | Propionyl-copiamycin | 3.125 | 12.5 | 12.5 | 12.5 | 6.25 | >50 |
| 12 | Butyryl-copiamycin | 50 | 1.56 | >50 | >50 | 12.5 | >50 |
| 13 | Acetyldihydro-copiamycin | 3.125 | 3.125 | 6.25 | 3.125 | 3.125 | 12.5 |
| 14 | Acetyletrahydro-copiamycin | 0.78 | 3.125 | 12.5 | 0.78 | 1.56 | 6.25 |

ANTI-TRICHOMONAL EFFECTS OF COPIAMYCIN AND ACYL COPIAMYCIN

Tested microorganism: Trichomonas vaginalis TV-1099 (about 100 cells/ml)

Medium: F medium (modified meat extract ... 1%  fluid agar polypepton ... 1% glucose ... 1%  NaCl ... 0.2% agar ... 0.2%

Method: Each of samples (about several mg) was dissolved in a small amount of methanol and was sterilized with an equal amount of chloroform. The mixture was left for awhile, was distilled off under reduced pressure at a low temperature around 35°C, was dissolved with a small amount of methanol, and was diluted with phosphate buffer solution (P.H. .... 6.8) to give a stock solution (1 mg/ml).

Dilution: 2ml × 2

ANTI-TRICHOMONAL EFFECTS OF COPIAMYCIN AND ACYL COPIAMYCIN

Cultivation: 38°C, 20 hours

Determination of effects:
The survival ratio and the variation were determined microscopically thus:

| Compound | 100 | 50 | 25 | 12.5 | 6.25 | 3.13 | control |
|---|---|---|---|---|---|---|---|
| Copiamycin | − | − | − | − | − | − | − |
| Copiamycin acetate | ++ | ++ | + | − | − | − | − |
| Copiamycin propionate | ++ | + | + | + | − | − | − |

(++: all killed — +: inhibitory — −: no effective)

The above data illustrates the superiority of the aceylated copiamycin derivatives.

What is claimed is:

1. Acetyl copiamycin having the infra-red absorption spectrum of FIG. 1 and the following elemental analysis:
C-58.54%
H-8.83%
H-3.08%
and having a melting point of 100–103°C.

2. A process for preparing water-soluble, active $C_1$ to $C_5$ carboxylate derivative of copiamycin-type compound selected from the group consisting of copiamycin, dihydro-copiamycin and tetrahydro-copiamycin, which comprises reacting said copiamycin-type compound at a temperature of 0°C to 100°C with 1 to 100 moles per mole of copiamycin-type compound of an anhydride of $C_1$ to $C_5$ carboxylic acid in sufficient amount of a solvent selected from the group consisting of $C_1$ to $C_6$ alcohol, alcohol ether, acid amide, and a mixture thereof capable of dissolving said copiamycin-type compound to at least suspend said compound, and recovering acylated derivative therefrom.

3. The process of claim 2 wherein said anhydride of $C_2$ to $C_4$ carboxylic acid.

4. The process of claim 2 wherein said anhydride is acetic anhydride.

5. The process of claim 2 where said reactants are copiamycin, and a member of the group consisting of acetic anhydride, propionic anhydride and butyric anhydride.

6. The $C_1$ to $C_5$ carboxylate derivative of a member of the group consisting of copiamycin, dihydro-copiamycin, and tetrahydro-copiamycin formed by the process of claim 2.

* * * * *